United States Patent
Kawahara et al.

(10) Patent No.: US 9,029,496 B2
(45) Date of Patent: May 12, 2015

(54) LIQUID CRYSTAL POLYESTER AMIDE RESIN

(71) Applicant: Polyplastics Co., Ltd., Tokyo (JP)

(72) Inventors: Toshinori Kawahara, Fuji (JP); Yoshiaki Taguchi, Fuji (JP)

(73) Assignee: Polyplastics Co., Ltd., Tokyo (JP)

( * ) Notice: Subject to any disclaimer, the term of this patent is extended or adjusted under 35 U.S.C. 154(b) by 0 days.

(21) Appl. No.: 14/355,450

(22) PCT Filed: Oct. 12, 2012

(86) PCT No.: PCT/JP2012/076460
§ 371 (c)(1),
(2) Date: Apr. 30, 2014

(87) PCT Pub. No.: WO2013/065471
PCT Pub. Date: May 10, 2013

(65) Prior Publication Data
US 2014/0256903 A1    Sep. 11, 2014

(30) Foreign Application Priority Data
Oct. 31, 2011    (JP) .................. 2011-239464

(51) Int. Cl.
| | |
|---|---|
| C08G 64/00 | (2006.01) |
| C08G 69/44 | (2006.01) |
| C08G 69/04 | (2006.01) |
| B01J 31/16 | (2006.01) |
| C08G 63/02 | (2006.01) |

(52) U.S. Cl.
CPC ............... *C08G 69/44* (2013.01); *C08G 69/04* (2013.01); *B01J 31/16* (2013.01)

(58) Field of Classification Search
USPC .......... 528/180, 181, 405; 430/108.1, 108.22, 430/108.3; 428/281.1
See application file for complete search history.

(56) References Cited

U.S. PATENT DOCUMENTS

| | | | |
|---|---|---|---|
| 5,980,777 A | 11/1999 | Umetsu et al. | |
| 2003/0100701 A1 | 5/2003 | Yokota | |
| 2004/0265539 A1* | 12/2004 | Hashimoto et al. ........... | 428/141 |
| 2009/0198070 A1 | 8/2009 | Mashima et al. | |

FOREIGN PATENT DOCUMENTS

| | | |
|---|---|---|
| EP | 2476664 A1 | 7/2012 |
| JP | 61/236827 A | 10/1986 |
| JP | H10/237286 A | 9/1998 |
| JP | H10/316743 A | 12/1998 |
| JP | H10/316873 A | 12/1998 |
| JP | 2002/322248 A | 11/2002 |
| JP | 2003/128782 A | 5/2003 |
| JP | 2004/339462 A | 12/2004 |
| JP | 2006/104370 A | 4/2006 |
| JP | 2007/525557 A | 9/2007 |
| JP | 2008/266543 A | 11/2008 |
| JP | 2009/185033 A | 8/2009 |
| JP | 2011/79810 A | 4/2011 |
| WO | WO 2004/096891 A | 11/2004 |

OTHER PUBLICATIONS

Brown D.A. et al. "Di-, tri-, and tetranuclear zinc hydroxamate complexes as structural models for the inhibition of zinc hydrolases by hydroxamic acids." Inorg Chem. May 29, 2006;45(11): pp. 4497-4507.*

* cited by examiner

*Primary Examiner* — Terressa Boykin
(74) *Attorney, Agent, or Firm* — Knobbe Martens Olson & Bear LLP

(57) ABSTRACT

Provided is a liquid crystal polyester amide resin which has a good hue. Specific monomers are polymerized using a specific catalyst. The specific monomers are composed of: at least one kind of a monomer selected from among aromatic aminocarboxylic acids, aromatic hydroxyamines and aromatic diamines; and at least one kind of a monomer selected from among aromatic hydroxy carboxylic acids, aromatic dicarboxylic acids or aliphatic dicarboxylic acids, and aromatic diols or aliphatic diols. It is preferable that the content of the at least one kind of a monomer selected from among aromatic aminocarboxylic acids, aromatic hydroxyamines and aromatic diamines is from 0.1 mol % to 85 mol % (inclusive).

6 Claims, No Drawings

LIQUID CRYSTAL POLYESTER AMIDE RESIN

TECHNICAL FIELD

The present invention relates to a liquid crystal polyester amide resin having a good hue.

BACKGROUND ART

A liquid crystalline resin capable of forming an anisotropic melt phase has been known as a material that is excellent in moldability, rigidity, heat resistance, chemical resistance and the like, and has been often employed as a material of various electrical and electronic parts.

The liquid crystalline resin is often used as a raw material for producing a molding which requires heat resistance because of its characteristics such as high melting point and excellent fluidity (Patent Document 1).

Patent Document 1 discloses, as applications which require heat resistance, controllers, and switches for household electric appliances, including lamp sockets, lamp holders, lamp base parts, electric or electronic connectors, circuit boards, terminal blocks, station connectors, heater mounts, ignition coils, relay sockets, high voltage connectors, spark plug parts, emergency switches, ovens, cooking utensils, and washers.

Thus, the liquid crystalline resin is suitably used as a material of a molding which requires heat resistance, while a liquid crystalline resin having a good hue cannot be obtained because of its very high polycondensation reaction temperature and processing temperature. However, poor hue may be the cause of limitation of use of the liquid crystalline resin in applications which require excellent appearance, leading to a large problem.

Due to such problems, a liquid crystalline resin having a good hue has been required and various proposals have been made. There have been proposed, as such method, for example, a method in which a benzoxazole compound is melt-kneaded with a liquid crystal polyester resin (Patent Document 2), a method in which a polycondensation reaction step of a liquid crystal polyester resin is performed in the presence of a metal dihydrogen phosphate (Patent Document 3) and the like. However, various proposals have been often made regarding a liquid crystal polyester resin. Even though a liquid crystal polyester amide resin is excellent in rigidity, heat resistance, and thermal conductivity among liquid crystalline resins, a proposal regarding the liquid crystal polyester amide resin has not been sufficiently made.

Patent Document 1: Japanese Unexamined Patent Application (Translation of PCT Application), Publication No. 2007-525557
Patent Document 2: Japanese Unexamined Patent Application, Publication No. H10-316873
Patent Document 3: Japanese Unexamined Patent Application, Publication No. 2006-104370

DISCLOSURE OF THE INVENTION

Problems to be Solved by the Invention

The present invention has been made so as to improve a hue of a liquid crystal polyester amide resin and an object thereof is to provide a liquid crystal polyester amide resin having a good hue.

Means for Solving the Problems

The present inventors have intensively studied so as to achieve the object of obtaining a liquid crystal polyester amide resin having a good hue. As a result, they have found that the above object can be achieved by performing polymerization using a specific catalyst, thus completing the present invention. More specifically, the present invention provides the followings.

(1) A liquid crystal polyester amide resin produced by using, as a catalyst, a tetranuclear zinc complex including a polynuclear metal complex represented by the below-mentioned general formula (I) in which 0 to 2 (inclusive) ($CF_3CO_2H$) (s) is/are coordinated per polynuclear metal complex, the liquid crystal polyester amide resin including: a repeating unit derived from at least one kind of a monomer selected from the group consisting of a monomer represented by the below-mentioned general formula (II), a monomer represented by the below-mentioned general formula (III) and a monomer represented by the below-mentioned general formula (IV), and a repeating unit derived from at least one kind of a monomer selected from the group consisting of a monomer represented by the below-mentioned general formula (V), a monomer represented by the below-mentioned general formula (VI) and a monomer represented by the below-mentioned general formula (VII):

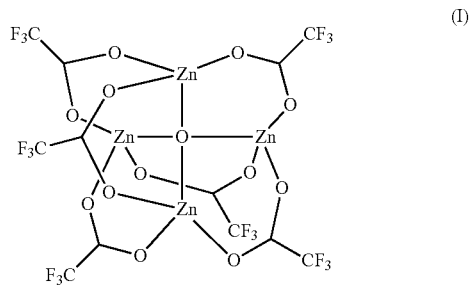

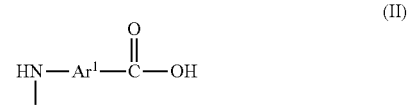

wherein $Ar^1$, $Ar^2$ and $Ar^3$, in the general formulas (II) to (IV), each represents a divalent aromatic group, and
R is a hydrogen atom, an alkyl group, an acetoxy group, an alkoxy group, an aryl group, or a halogen atom.

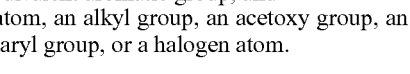

wherein $Ar^4$ each independently represents a divalent aromatic group, and
$Ar^5$ and $Ar^6$ each independently represents a divalent group selected from a divalent aromatic group, a divalent alicyclic group, and a divalent aliphatic group.

(2) The liquid crystal polyester amide resin according to (1), wherein the content of a repeating unit derived from at least one kind of a monomer derived from the group consisting of a monomer represented by the general formula (II), a monomer represented by the general formula (III) and a monomer represented by the general formula (IV) is from 0.1 mol % to 85 mol % (inclusive).

(3) The liquid crystal polyester amide resin according to (1) or (2), wherein R in the general formulas (II) to (IV) is an acetoxy group.

(4) The liquid crystal polyester amide resin according to any one of (1) to (3), which is a linear polymer.

(5) The liquid crystal polyester amide resin according to any one of (1) to (4), wherein a main repeating unit is a repeating unit derived from 4-hydroxybenzoic acid, a repeating unit derived from acetoxyaminobenzoic acid, and a repeating unit derived from 6-hydroxy-2-naphthoic acid.

(6) A method for producing a liquid crystal polyester amide resin, which includes performing melt polymerization of at least one kind of a monomer selected from the group consisting of a monomer represented by the below-mentioned general formula (II), a monomer represented by the below-mentioned general formula (III) and a monomer represented by the below-mentioned general formula (IV) with at least one kind of a monomer selected from the group consisting of a monomer represented by the below-mentioned general formula (V), a monomer represented by the below-mentioned general formula (VI) and a monomer represented by the below-mentioned general formula (VII)

in the presence of a catalytic amount of a tetranuclear zinc complex including a polynuclear metal complex represented by the below-mentioned general formula (I) in which 0 to 2 (inclusive) ($CF_3CO_2H$) (s) is/are coordinated per polynuclear metal complex:

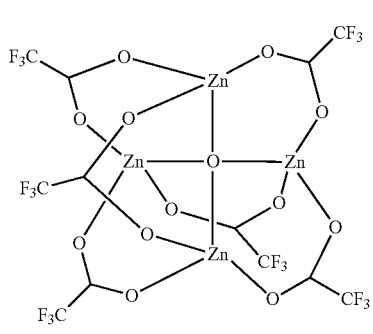

(I)

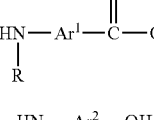

(II)

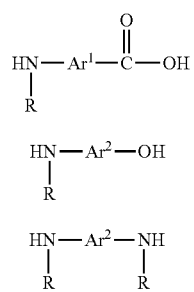

(III)

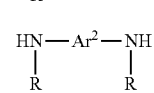

(IV)

wherein $Ar^1$, $Ar^2$, $Ar^3$, in the general formulas (II) to (IV), each represents a divalent aromatic group, and
R is a hydrogen atom, an alkyl group, an acetoxy group, an alkoxy group, an aryl group, or a halogen atom.

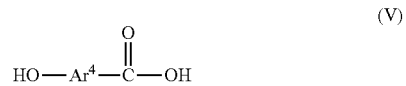

(V)

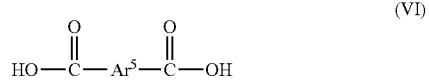

(VI)

(VII)

wherein $Ar^4$ each independently represents a divalent aromatic group, and
$Ar^5$ and $Ar^6$ each independently represents a divalent group selected from a divalent aromatic group, a divalent alicyclic group and a divalent aliphatic group.

Effects of the Invention

According to the present invention, it is possible to produce a liquid crystal polyester amide resin having a good hue.

PREFERRED MODE FOR CARRYING OUT THE INVENTION

Embodiments of the present invention will be described below. The present invention is not limited to the following embodiments.

A liquid crystal polyester amide resin of the present invention is produced by using a specific monomer as a raw material and using a specific catalyst, thus making it possible to provide a liquid crystal polyester amide resin having a good hue. The present invention will be described below in the order of a catalyst, a method for producing a liquid crystal polyester amide resin, and a liquid crystal polyester amide resin.

Catalyst

A catalyst used to produce a liquid crystal polyester amide resin of the present invention is a tetranuclear zinc complex including a polynuclear metal complex represented by the below-mentioned general formula (I) in which 0 to 2 (inclusive) ($CF_3CO_2H$) (s) is/are coordinated per polynuclear metal complex. Although the ligand is not indispensable to produce a liquid crystal polyester amide resin of the present invention, the ligand is preferably coordinated to the polynuclear metal complex for the reason of an improvement in absorbency. The number of ($CF_3CO_2H$) is preferably 1.

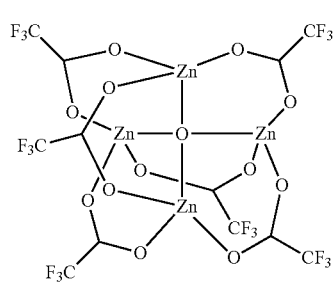

(I)

It is assumed that use of the catalyst in the production of a liquid crystal polyester amide resin enables proceeding of amidation and esterification with good balance during the polymerization of a monomer. Thus, it is assumed that the liquid crystal polyester amide resin obtained by using the catalyst becomes a random copolymer to obtain a liquid crystal polyester amide resin having a good hue.

Method for Producing Liquid Crystal Polyester Amide Resin

In a method for producing a liquid crystal polyester amide resin, a monomer as a raw material includes at least one of monomers represented by the general formulas (II) to (IV):

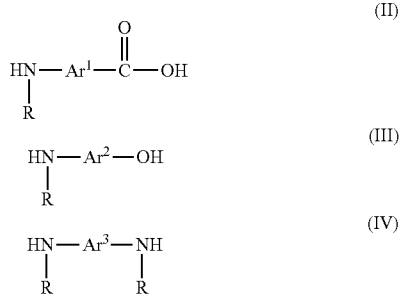

wherein $Ar^1$, $Ar^2$, $Ar^3$, in the general formulas (II) to (IV), each represents a divalent aromatic group, and R is a hydrogen atom, an alkyl group, an acetoxy group, an alkoxy group, an aryl group, or a halogen atom.

The general formula (II) represents an aromatic aminocarboxylic acid. Specific examples of the aromatic aminocarboxylic acid include 4-aminobenzoic acid, 3-aminobenzoic acid, 4-amino-4'-carboxybiphenyl, 4-amino-4'-carboxybiphenylether, 4-amino-4'-carboxybiphenyl sulfide, 4-amino-4'-carboxybiphenylsulfone, 3-amino-3'-carboxybenzophenone, 4-amino-4'-carboxybenzophenone, 1-amino-4-carboxynaphthalene, 2-amino-6-carboxynaphthalene and the like. As mentioned above, in the present invention, it is preferred to use a monomer capable of imparting a linear structure to a polymer. Examples thereof include 4-aminobenzoic acid, 3-aminobenzoic acid, 4-amino-4'-carboxybiphenyl, 4-amino-4'-carboxybiphenylether, 4-amino-4'-carboxybiphenyl sulfide, and 4-amino-4'-carboxybiphenylsulfone. An amino group may be either primary or secondary. It is possible to preferably use those in which hydrogen of the amino group is substituted with an acetoxy group. It is also possible to use aromatic aminocarboxylic acids in which all or part of hydrogen atoms on the aromatic ring are substituted with an alkyl group, an alkoxy group, or a halogen atom.

The general formula (III) represents an aromatic hydroxyamine. Specific examples of the aromatic hydroxylamine include 4-aminophenol, 3-aminophenol, 4-amino-1-naphthol, 4-amino-4'-hydroxybiphenyl, 4-amino-4'-hydroxybiphenylether, 4-amino-4'-hydroxybiphenylmethane, and 4-amino-4'-hydroxybiphenyl sulfide. As mentioned above, it is preferred to use a monomer capable of imparting a linear structure to a polymer. Examples thereof include 4-aminophenol, 4-amino-4'-hydroxybiphenyl, 4-amino-4'-hydroxydiphenylether, 4-amino-4'-hydroxydiphenylmethane, 4-amino-4'-hydroxydiphenyl sulfide and the like. An amino group may be either primary or secondary. It is possible to preferably use those in which hydrogen of the amino group is substituted with an acetoxy group. It is also possible to use aromatic hydroxylamines in which all or part of hydrogen atoms on the aromatic ring existing in these aromatic hydroxyamines are substituted with an alkyl group, an alkoxy group, an aryl group, or a halogen atom.

The general formula (IV) represents an aromatic diamine. Specific examples of the aromatic diamine include 1,4-phenylenediamine, 4,4'-diaminobiphenyl, 4,4'-diaminobiphenyl sulfide (thiodianiline), 4,4'-diaminobiphenylsulfone, 2,5-diaminotoluene, 4,4'-methylenedianiline, 4,4'-ethylenedianiline, 4,4'-diaminodiphenoxyethane, 4,4'-diaminodiphenylether (oxydianiline) and the like. As mentioned above, in the present invention, it is preferred to use a monomer capable of imparting a linear structure to a polymer. Examples thereof include 1,4-phenylenediamine, 4,4'-diaminobiphenyl, 4,4'-diaminobiphenyl sulfide (thiodianiline), 4,4'-diaminobiphenylsulfone, 4,4'-methylenedianiline, 4,4'-diaminodiphenylether (oxydianiline) and the like. An amino group may be either primary or secondary. It is also possible to preferably use those in which hydrogen of the amino group is substituted with an acetoxy group. It is also possible to use aromatic hydroxylamines in which all or part of hydrogen atoms on the aromatic ring existing in these aromatic hydroxyamines are substituted with an alkyl group, an alkoxy group, an aryl group, or a halogen atom.

In order to impart good thermal diffusivity to a liquid crystal polyester amide resin, an aromatic aminocarboxylic acid is preferably used, among monomers represented by the general formulas (II) to (IV), a monomer capable of imparting a linear structure to a liquid crystal polyester amide resin is preferably used, among the aromatic aminocarboxylic acid, and 4-acetoxyaminobenzoic acid is most preferably used.

It is possible to use, as a monomer which is a raw material used to produce a liquid crystal polyester amide resin, at least one of monomers represented by the below-mentioned general formulas (V) to (VII):

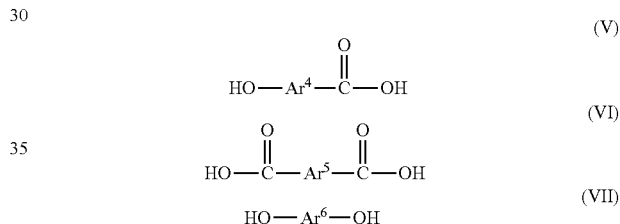

wherein $Ar^4$ each independently represents a divalent aromatic group, and $Ar^5$ and $Ar^6$ each independently represents a divalent group selected from a divalent aromatic group, a divalent alicyclic group and a divalent aliphatic group (preferably a divalent aromatic group). All or part of hydrogen atoms on the aromatic ring existing in the divalent aromatic group may be substituted with an alkyl group, an alkoxy group, or a halogen atom. Herein, the divalent alicyclic group means a group obtained by removing two hydrogen atoms from an alicyclic compound, and the divalent aliphatic group means a group obtained by removing two hydrogen atoms from an aliphatic compound.

The general formula (V) represents an aromatic hydroxycarboxylic acid. Specific examples of the aromatic hydroxycarboxylic acid include 4-hydroxybenzoic acid, 3-hydroxybenzoic acid, 6-hydroxy-2-naphthoic acid, 7-hydroxy-2-naphthoic acid, 6-hydroxy-1-naphthoic acid, 4'-hydroxybiphenyl-4-carboxylic acid and the like. Among these monomers, a monomer usable in the production of a linear polymer is preferably used. Among the above examples, for example, 4-hydroxybenzoic acid, 3-hydroxybenzoic acid, and 4'-hydroxybiphenyl-4-carboxylic acid are used. It is also possible to use aromatic hydroxycarboxylic acids in which all or part of hydrogen atoms on the aromatic ring existing in these aromatic hydroxycarboxylic acids are substituted with an alkyl group, an alkoxy group, or a halogen atom.

The general formula (VI) represents an aromatic dicarboxylic acid or an aliphatic dicarboxylic acid. Specific examples of the aromatic dicarboxylic acid include terephthalic acid, 4,4'-biphenyldicarboxylic acid, 4,4"-triphenyldicarboxylic acid, 2,6-naphthalenedicarboxylic acid, biphenylether-4,4'-dicarboxylic acid, isophthalic acid, and diphenylether-3,3'-dicarboxylic acid. As mentioned above, in the present invention, it is preferred to use a monomer capable of imparting a linear structure to a polymer. Examples thereof include terephthalic acid, 4,4'-biphenyldicarboxylic acid, biphenylether-4,4'-dicarboxylic acid and the like. It is also possible to use aromatic dicarboxylic acids in which all or part of hydrogen atoms on the aromatic ring existing in the aromatic dicarboxylic acids are substituted with an alkyl group, an alkoxy group, an aryl group, or a halogen atom.

Specific examples of the aliphatic dicarboxylic acid include malonic acid, succinic acid, adipic acid, trans-1,4-cyclohexanedicarboxylic acid, cis-1,4-cyclohexanedicarboxylic acid, and 1,3-cyclohexanedicarboxylic acid. It is also possible to use aliphatic dicarboxylic acids in which all or part of hydrogen atoms of an aliphatic or alicyclic group existing in aliphatic dicarboxylic acids are substituted with an alkyl group, an alkoxy group, an aryl group, or a halogen atom.

The general formula (VII) represents an aromatic diol or an aliphatic diol. Specific examples of the aromatic diol include 1,4-benzenediol, 1,3-benzenediol, naphthalene-2,6-diol, 4,4'-biphenylenediol, 3,3'-biphenylenediol, 4,4'-dihydroxydiphenylether, and 4,4'-dihydroxydiphenylsulfone. As mentioned above, in the present invention, it is preferred to use a monomer capable of imparting a linear structure to a polymer. Examples thereof include 1,4-benzenediol, 4,4'-biphenylenediol, 4,4'-dihydroxydiphenylether, 4,4'-dihydroxydiphenylsulfone and the like. It is also possible to use aromatic diols in which all or part of hydrogen atoms on the aromatic ring existing in the aromatic diols are substituted with an alkyl group, an alkoxy group, an aryl group, or a halogen atom.

Specific examples of the aliphatic diol include ethylene glycol, propylene glycol, butylenediol, neopentyl glycol, 1,6-hexanediol, trans-1,4-cyclohexanediol, cis-1,4-cyclohexanediol, trans-1,4-cyclohexanedimethanol, cis-1,4-cyclohexanedimethanol, trans-1,3-cyclohexanediol, cis-1,2-cyclohexanediol, and trans-1,3-cyclohexanedimethanol. It is also possible to use aliphatic diols in which all or part of hydrogen atoms of an aliphatic or alicyclic group existing in the aromatic diols are substituted with an alkyl group, an alkoxy group, an aryl group, or a halogen atom.

Among monomers represented by the general formulas (V) to (VII), an aromatic hydroxycarboxylic acid is preferably used, and 4-hydroxybenzoic acid and 6-hydroxy-2-naphthoic acid are particularly preferably used. Originally, it is desired to be composed of 4-hydroxybenzoic acid capable of imparting a linear structure. It is also preferred to optionally use in combination with a crank monomer such as 6-hydroxy-2-naphthoic acid for the purpose of controlling a melting point to improve processability.

It is also possible to introduce, as a raw material for the production of a liquid crystal polyester amide resin of the present invention, a small amount of monomers except for monomers represented by the general formulas (II) to (VII) within a range that does not impair the object of the present invention. It is preferred that these constituting units are not substantially included.

The liquid crystal polyester amide resin of the present invention is obtained by a linear polymerization method or a transesterification method, using the above-mentioned monomers as raw materials. During the polymerization, a melt polymerization method, a solution polymerization method, a slurry polymerization method, a solid phase polymerization method and the like may be used.

In the present invention, it is possible to use an acylating agent to a polymerized monomer, and a monomer having the activated end as an acid chloride derivative during the polymerization. Examples of the acylating agent include an acid anhydride such as acetic anhydride.

The catalyst used during the polymerization is as mentioned above. It is one of features of the present invention to use a specific catalyst during the production of a liquid crystal polyester amide resin. There is no particular limitation on the used amount of a catalyst (catalytic amount), and the catalyst can be appropriately used in a preferred amount depending on kinds of monomers and conditions during the polymerization. For example, the use amount of the catalyst is preferably from 0.000001 part by mass to 0.005 part by mass (inclusive) when the total mass of the monomer is 100 parts by mass.

When solution polymerization or slurry polymerization is performed, liquid paraffin, high heat-resistant synthetic oil, inactive mineral oil or the like are used as a solvent.

There is no particular limitation on the reaction conditions, and it is preferred that the reaction temperature is set at 200° C. to 380° C. (inclusive) and the final ultimate pressure is set at 0.1 Torr to 760 Torr (inclusive). Particularly, in the melting reaction, the reaction temperature is preferably set at 260° C. to 380° C. (inclusive), more preferably 300° C. to 360° C. (inclusive), and the final ultimate pressure is preferably set at 1 Torr to 100 Torr (inclusive), and more preferably at 1 Torr to 50 Torr (inclusive).

The reaction can be initiated after charging all raw material monomers, an acylating agent and a catalyst in the same reaction vessel (single stage system). It is also possible to react with carboxyl groups after acylating hydroxyl groups of raw material monomers having hydroxyl groups (two stage system).

The melt polymerization is performed by initiating decompression to thereby control to predetermined vacuum degree after reaching a predetermined temperature inside a reaction system. After a torque of a stirrer reaches a predetermined value, an inert gas is introduced and a vacuum state is allowed to turn into a predetermined pressurized state after undergoing a normal pressure state, and then a polymer is discharged out of the reaction system.

The liquid crystal polyester amide resin produced by the polymerization method is subjected to solid phase polymerization of heating in an inert gas under normal or reduced pressure, thus enabling an increase in the molecular weight. Regarding preferred conditions of the solid phase polymerization reaction, the reaction temperature is from 230° C. to 350° C. (inclusive), and more preferably from 260° C. to 330° C. (inclusive), and the final ultimate pressure is from 10 Torr to 760 Torr (inclusive).

Liquid Crystal Polyester Amide Resin

As mentioned above, the liquid crystal polyester amide resin of the present invention is produced by polymerizing a monomer having an amino group with a monomer having no amino group, using a specific catalyst. As a result, the monomer having an amino group and the monomer having no amino group are polymerized at random. A liquid crystal polyester amide resin having a good hue is obtained by polymerization at random.

High thermal diffusivity of a resin molding obtained by molding reveals that the liquid crystal polyester amide resin is polymerized at random. Since a random copolymer enables uniform dispersion of amide bonds exhibiting an intermolecular interaction as compared with a block copolymer, (leading to small steric hindrance), molecules are closely packed and a resin molding obtained by molding exhibits high thermal diffusivity, thus making it possible to recognize that the resin molding is a random copolymer.

In the liquid crystal polyester amide resin, the content of a repeating unit derived from at least one kind of a monomer selected from the group consisting of a monomer represented by the general formula (II), a monomer represented by the general formula (III) and a monomer represented by the general formula (IV) is preferably from 0.1 mol % to 85 mol % (inclusive). The content is preferably 0.1 mol % or more since a resin molding obtained by molding exhibits higher thermal diffusivity. From the viewpoint of manufacturability and processability of a liquid crystal polyester amide resin, the content is more preferably from 0.5 mol % to 30 mol % (inclusive), and more preferably from 5 mol % to 30 mol % (inclusive). It is possible to control the content of the repeating unit derived from the monomer by controlling the use amount of each monomer.

Good thermal diffusivity of the liquid crystal polyester amide resin produces good effect in view of hue. After completion of the polymerization, a resin is taken out from a polymerization can in a molten state and then formed into a desired form (usually, pellets). Good thermal diffusivity enables easier diffusion of extra heat, and thus hue is less likely to undergo deterioration that is caused by heat deterioration due to retention at high temperature.

The liquid crystal polyester amide resin preferably has a linear structure so as to more improve thermal diffusivity. It is assumed that the liquid crystal polyester amide resin has a linear structure, whereby, a distance between molecules in a resin molding decreases and thus a resin molding obtained by molding has more enhanced thermal diffusivity. As mentioned above, the liquid crystal polyester amide resin having a linear structure can be produced by selecting a specific monomer as a raw material. With respect to "linear", there is no need to compose the entire raw material monomer of the monomer capable of imparting a linear structure, and other monomers may be appropriately included. In the present invention, the content of a repeating unit derived from a monomer capable of imparting a linear structure preferably becomes 70 mol % or more. The content is more preferably 75 mol % or more.

Among monomers represented by the general formulas (II) to (IV), a monomer having a secondary amino group in which hydrogen of an amino group is substituted with an acetoxy group can be preferably used. Use of the monomer makes the reaction between monomers having an amino group difficult, and thus a random copolymer may be obtained easier.

EXAMPLES

The present invention will be described below by way of Example and Comparative Example. The present invention is not limited to the following Example.
Raw Material Monomer
Aromatic hydroxycarboxylic acid 1: 4-Hydroxybenzoic acid (HBA)
Aromatic hydroxycarboxylic acid 2: 6-Hydroxy-2-naphthoic acid (HNA)
Aromatic aminocarboxylic acid: 4-Acetoxyaminobenzoic acid (PAABA)
Catalyst
Catalyst 1: Tetranuclear zinc complex including a polynuclear metal complex represented by the below-mentioned general formula (I) in which one ($CF_3CO_2H$) is coordinated per polynuclear metal complex
Catalyst 2: Potassium acetate

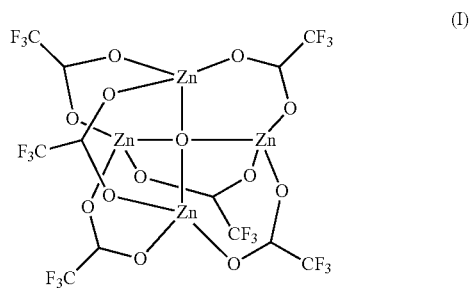

(I)

Production of Liquid Crystal Polyester Amide Resin of Example 1

In a reactor equipped with a stirrer and a distillation tube, 100 parts by mass of a monomer mixture containing monomers shown in Table 1 in a ratio shown in Table 1, the catalyst 1 in the amount of 75 ppm by mass relative to the monomer mixture, and 102 parts by mass of acetic anhydride were charged. After sufficient replacement by a nitrogen gas, the temperature was raised to 30° C. under the conditions of a normal pressure and then stirring was initiated. After stirring at 140° C. for 60 minutes, the temperature was gradually raised and by-produced acetic acid was distilled off. Upon reaching the temperature of 360° C., the reactor was gradually decompressed and stirring was continued under a pressure of 10 Torr (i.e. 1,333 Pa) for 0.25 hour. Upon reaching a target stirring torque, a discharge port at a lower portion of the reactor was opened and then a resin was taken out in a strand form using a nitrogen pressure. The thus discharged strand was formed into granules by a pelletizer.

Production of Liquid Crystal Polyester Amide Resin of Comparative Example 1

In a reactor equipped with a stirrer and a distillation tube, 100 parts by mass of a monomer mixture containing monomers shown in Table 1 in a ratio shown in Table 1, the catalyst 2 in the amount of 75 ppm by mass relative to the monomer mixture, and 102 parts by mass of acetic anhydride were charged. After sufficient replacement by a nitrogen gas, the temperature was raised to 30° C. under the conditions of a normal pressure and then stirring was initiated. After stirring at 140° C. for 60 minutes, the temperature was gradually raised and by-produced acetic acid was distilled off. Upon reaching the temperature of 360° C., the reactor was gradually decompressed and stirring was continued under a pressure of 10 Torr (i.e. 1,333 Pa) for 0.25 hour. Upon reaching a target stirring torque, a discharge port at a lower portion of the reactor was opened and then a resin was taken out in a strand form using a nitrogen pressure. The thus discharged strand was formed into granules by a pelletizer.

Evaluation of Liquid Crystal Polyester Amide Resin
[Melting Point and Melt Viscosity]

A melting point of this liquid crystal polyester amide resin is shown in Table 1. The melting point was measured by DSCQ-1000 manufactured by TA Instruments. A melt viscosity at a temperature of 360° C. and a shear rate of 1,000 $second^{-1}$ is shown in Table 1. The melt viscosity was measured by Capillograph manufactured by TOYO SEIKI Co., Ltd. using an orifice of 1 mm in inner diameter and 20 mm in length. The measurement of the melting point and the melt viscosity revealed that the polymerization proceeded to obtain a desired liquid crystal polyester amide resin.

[Thermal Diffusivity]

Using a mini test press 10 manufactured by TOYO SEIKI Co., Ltd., a 0.1 mm thick film-shaped specimen was produced at 360° C. (temperature of about a melting point+30° C.). Using ai-Phase Mobilelu manufactured by ai-Phase Co., Ltd. as a measuring device, thermal diffusivity was measured under the conditions of AC frequency of 2 to 300 Hz. The measurement results are shown in Table 1 (unit: $\times 10^{-7}$).

[Film Hue]

Film hue of the specimen was measured by SE6000 manufactured by Nippon Denshoku Industries Co., Ltd. The evaluation results are shown in Table 1.

TABLE 1

|  |  | Comparative Example 1 | Example 1 |
|---|---|---|---|
| HBA (mol %) |  | 70 | 70 |
| HNA (mol %) |  | 20 | 20 |
| PAABA (mol %) |  | 10 | 10 |
| Catalyst 1 |  |  | 75 |
| Catalyst 2 |  | 75 |  |
| Melting point (° C.) |  | 327.2 | 331.9 |
| Melt viscosity | Pa · s | 51.1 | 38.9 |
|  | slope | −0.52 | −0.56 |
| Thermal diffusivity ($\times 10^{-7}$) |  | 1.67 | 1.99 |
| Hue | L | 76.5 | 78.0 |
|  | b | 22.1 | 21.8 |

With respect to the hue, an L value obtained by using the catalyst 1 is higher than that obtained by using the catalyst 2.

In spite of the same kind of monomers and same use amount of monomers used as raw materials, thermal diffusivity obtained by using the catalyst 1 is higher than that obtained by using the catalyst 2. Accordingly, it was assumed that the liquid crystal polyester amide resin produced by using the catalyst 1 is a random copolymer.

What is claimed is:

1. A liquid crystal polyester amide resin, which is a random copolymer, produced by using, as a catalyst, a tetranuclear zinc complex including a polynuclear metal complex represented by the below-mentioned general formula (I) in which 0 to 2 (inclusive) $(CF_3CO_2H)(s)$ is/are coordinated per polynuclear metal complex, the liquid crystal polyester amide resin comprising:

a repeating unit derived from at least one kind of a monomer selected from the group consisting of a monomer represented by the below-mentioned general formula (II), a monomer represented by the below-mentioned general formula (III) and a monomer represented by the below-mentioned general formula (IV), and a repeating unit derived from at least one kind of a monomer selected from the group consisting of a monomer represented by the below-mentioned general formula (V), a monomer represented by the below-mentioned general formula (VI) and a monomer represented by the below-mentioned general formula (VII):

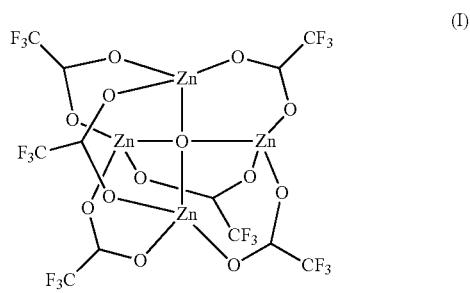

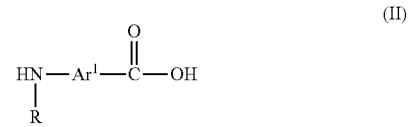

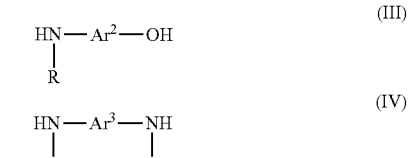

wherein $Ar^1$, $Ar^2$ and $Ar^3$, in the general formulas (II) to (IV), each represents a divalent aromatic group, and R is a hydrogen atom, an alkyl group, an acetoxy group, an alkoxy group, an aryl group, or a halogen atom:

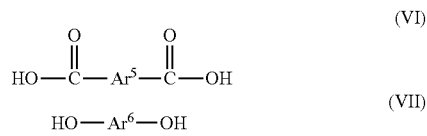

wherein $Ar^4$ represents a divalent aromatic group, and $Ar^5$ and $Ar^6$ each independently represents a divalent group selected from a divalent aromatic group, a divalent alicyclic group, and a divalent aliphatic group.

2. The liquid crystal polyester amide resin according to claim 1, wherein the content of a repeating unit derived from at least one kind of a monomer derived from the group consisting of a monomer represented by the general formula (II), a monomer represented by the general formula (III) and a monomer represented by the general formula (IV) is from 0.1 mol % to 85 mol % (inclusive).

3. The liquid crystal polyester amide resin according to claim 1, wherein R in the general formulas (II) to (IV) is an acetoxy group.

4. The liquid crystal polyester amide resin according claim 1, which is a linear polymer.

5. The liquid crystal polyester amide resin according to claim 1, wherein a main repeating unit is a repeating unit derived from p-hydroxybenzoic acid, and a repeating unit derived from acetoxyaminobenzoic acid.

6. A method for producing a liquid crystal polyester amide resin, which is a random copolymer, which comprises performing melt polymerization of at least one kind of a monomer selected from the group consisting of a monomer represented by the below-mentioned general formula (II), a monomer represented by the below-mentioned general formula (III) and a monomer represented by the below-mentioned general formula (IV) with at least one kind of a monomer selected from the group consisting of a monomer represented by the below-mentioned general formula (V), a monomer represented by the below-mentioned general formula (VI) and a monomer represented by the below-mentioned general formula (VII)

in the presence of a catalytic amount of a tetranuclear zinc complex including a polynuclear metal complex represented by the below-mentioned general formula (I) in which 0 to 2 (inclusive) $(CF_3CO_2H)(s)$ is/are coordinated per polynuclear metal complex:

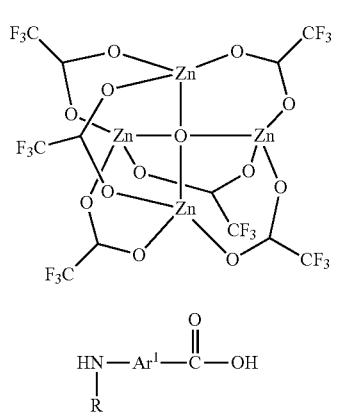
(I)

(II)

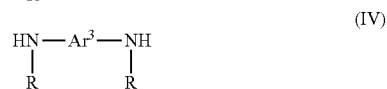
(III)

(IV)

wherein $Ar^1$, $Ar^2$, $Ar^3$, in the general formulas (II) to (IV), each represents a divalent aromatic group, and R is a hydrogen atom, an alkyl group, an acetoxy group, an alkoxy group, an aryl group, or a halogen atom, and

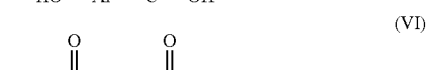
(V)

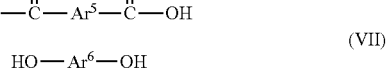
(VI)

(VII)

wherein $Ar^4$ each independently represents a divalent aromatic group, and $Ar^5$ and $Ar^6$ each independently represents a divalent group selected from a divalent aromatic group, a divalent alicyclic group and a divalent aliphatic group.

* * * * *